UNITED STATES PATENT OFFICE.

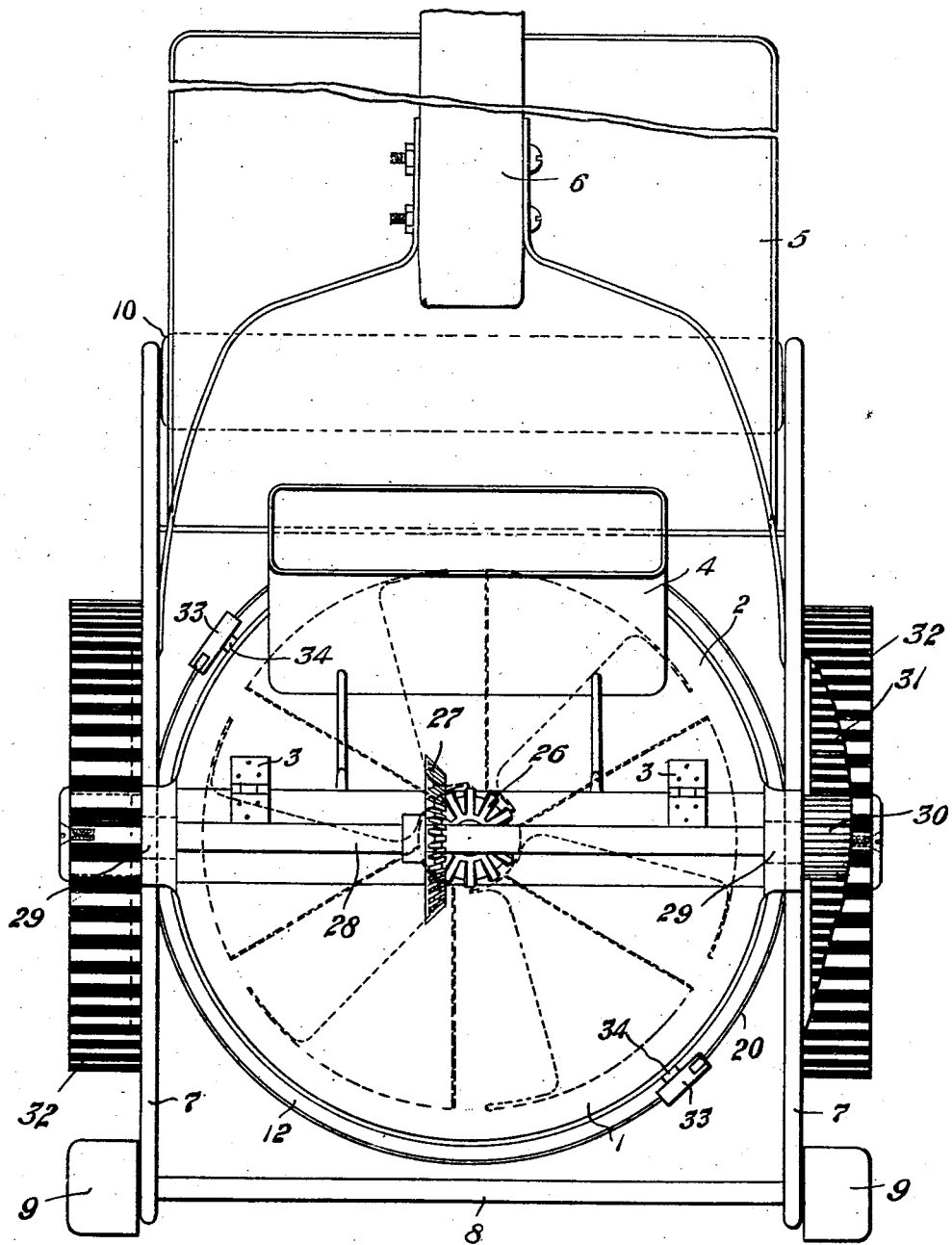

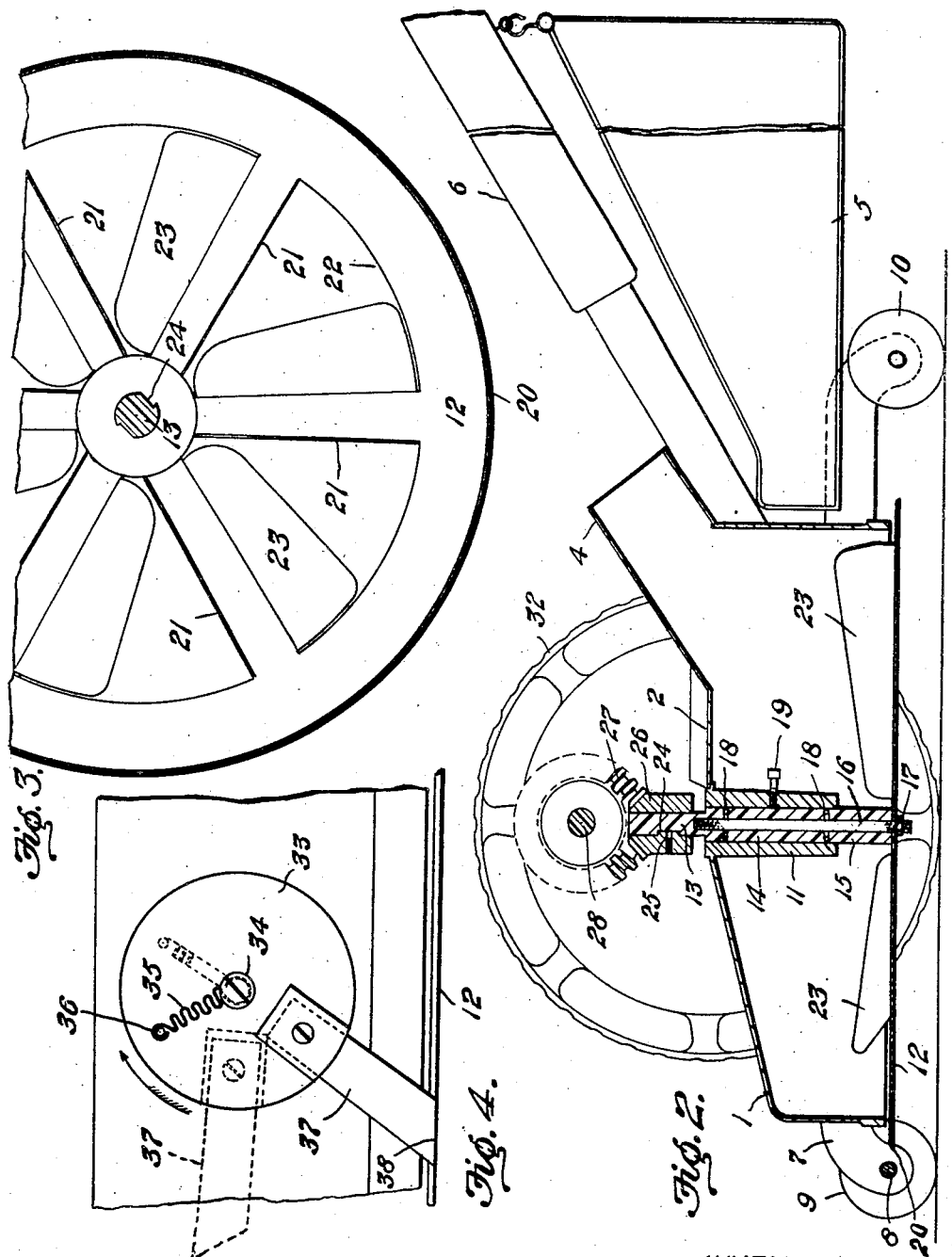

ERNEST E. MUZZY, OF CANTON, OHIO, ASSIGNOR OF ONE-HALF TO CHARLES H. RITTERBUSH, OF CANTON, OHIO.

LAWN-MOWER.

1,336,257.   Specification of Letters Patent.   Patented Apr. 6, 1920.

Application filed April 11, 1919. Serial No. 289,195.

*To all whom it may concern:*

Be it known that I, ERNEST E. MUZZY, a citizen of the United States, residing at Canton, in the county of Stark and State of Ohio, have invented a new and useful Lawn-Mower, of which the following is a specification.

This invention relates to lawn mowers and more especially to a lawn mower provided with a horizontal rotating knife.

The object of the invention is to provide a lawn mower having a horizontally disposed cutting disk provided with a peripheral cutting edge and with radial cutting edges and having radial wings thereon adapted to convey the cut grass away from the mower; and to simplify and improve the construction of lawn mowers.

With these objects in view the invention consists in the novel construction and arrangement of parts, hereinafter described, illustrated in the accompanying drawings, and particularly pointed out in the appended claims, it being understood that various changes in the form, proportions, size and minor details of construction may be made within the scope of the appended claim, without departing from the spirit or sacrificing any of the advantages of the invention.

The invention thus set forth in general terms is illustrated in the accompanying drawings forming part hereof, in which—

Figure 1 is a plan view of a lawn mower embodying the invention.

Fig. 2 is a longitudinal sectional view therethrough.

Fig. 3 is a plan view of the rotary cutting disk.

Fig. 4 is a fragmentary view of a portion of the housing and cutting disk showing one of the disk sharpeners.

A practical embodiment of the invention is disclosed in the accompanying drawings, forming a part of this specification in which similar numerals of reference indicate corresponding parts throughout the several views.

The housing within which the rotary cutting disk is carried comprises the forward portion 1 and the rear portion 2, which portions are hinged together as shown at 3 to more readily gain access to the interior. A rearwardly disposed spout 4 is provided upon the rear portion of the housing and arranged to direct the cut grass into the basket 5, which is suspended from the handle 6 in the usual manner.

A pair of parallel arms 7 are attached to the sides of the housing and extend some distance beyond the housing to the front and rear, the forward extremities of said arms carrying a shaft 8 upon which are mounted the rollers 9 while the rear extremities of the arms have journaled therein the axis of an elongated roller 10 extending across the width of the device.

Formed integrally with the forward portion of the housing is a cylindrical bearing member 11 within which is located the stem of the rotating disk 12, said stem being formed in three sections designated by the numerals 13, 14 and 15, a tie bolt 16 being passed through the three sections and connecting the upper section 13 and the lower section 15, the lower extremity of said bolt being passed through the center of the cutting disk 12, a nut 17 being located thereon to hold the cutting disk firmly in position upon the stem. Ball bearings 18 are located at the upper and lower extremities of the central section 14 and a set screw 19 is located through the bearing member 11 and contacts with the periphery of the said section 14.

The rotating cutting disk 12 is provided with the peripheral cutting edge 20 and with the radial cutting edges 21 and an inner circular cutting edge 22 formed by cutting the vanes 23 from the disk as shown in the drawings and bending them upwardly at an angle, a substantially tri-angular cut-out portion being formed between each vane and the adjacent cutting edge 21. It will be understood that although it is preferable to form the rotating disk of one piece forming the vanes therefrom, that the vanes may be made of separate pieces and "spot welded" or otherwise connected to the body of the cutting disk.

The upper portion 13 of the stem is provided with a ratchet 24 engaged by a suitable pin 25, carried in the beveled pinion 26 which is loosely mounted upon said stem portion. The pinion 26 meshes with a beveled gear 27 carried on the horizontal shaft 28, said shaft being mounted in suitable bearings 29 carried at each side of the housing, a pinion 30 being mounted upon each extremity of said shaft and meshing with the internal gear 31 of the adjacent driving wheel 32.

For the purpose of keeping the periphery of the cutting disk sharp, one or more sharpening devices may be provided and a housing arranged to be moved into contact with the periphery of the disk while the mower is in operation. Each of these devices comprises a disk 33 pivotally mounted upon a pin 34 carried by the housing, a spring 35 having one end coiled around the pin 34 and the other end around a stud 36 carried by the disk 33. A sharpening stone 37 of any suitable material is carried by the disk 33, the lower end thereof being cut at an angle as shown at 38. In Fig. 4 the sharpening device is shown in engagement with the cutting disk and is also shown in dotted lines in the raised position. When the sharpening device is in the operative position the spring 36 will hold the stone 37 in engagement with the cutting edge of the disk 12 and when the disk 33 is rotated in the direction of the arrow, raising the stone 37 out of engagement with the cutting disk the stud 36 will be thrown over the center of the disk 33 and the spring 35 will thus hold the sharpening device out of engagement with the cutting disk.

In operation as the lawn mower is moved forward, the cutting disk 12 will be rotated through the gearing above described and as the mower is stopped or moved backward the cutting disk will be allowed to continue to rotate owing to the ratchet arrangement in the stem above described. As the disk rotates the several cutting edges thereon will clip the grass at the height to which the cutting disk 12 is adjusted, the clipped grass passing backward over the inclined vanes 23 and through the rearwardly disposed spout 4 into the basket 5.

Although the drawings and above specification disclose the best mode in which I have contemplated embodying my invention I desire to be not limited to the details of such disclosure, for, in the further practical application of my invention, many changes in form and construction may be made, as circumstances require or experience suggests, without departing from the spirit of the invention, within the scope of the appended claim.

I claim—

In a lawn mower, a rotary cutting disk provided with a peripheral cutting edge and with radial cut-out portions in said disk, a cutting edge formed upon one edge of each cut-out portion and an upwardly inclined vane formed at the opposite edge of each cut-out portion.

In testimony that I claim the above I have hereunto subscribed my name.

ERNEST E. MUZZY.